(12) United States Patent
Schultheiss

(10) Patent No.: US 6,684,696 B2
(45) Date of Patent: Feb. 3, 2004

(54) FILLING-LEVEL MEASURING DEVICE THAT EVALUATES ECHO SIGNALS

(75) Inventor: Daniel Schultheiss, Hornberg (DE)

(73) Assignee: Vega Grieshaber, KG, Wolfach (DE)

( * ) Notice: Subject to any disclaimer, the term of this patent is extended or adjusted under 35 U.S.C. 154(b) by 0 days.

(21) Appl. No.: 09/929,283

(22) Filed: Aug. 15, 2001

(65) Prior Publication Data

US 2002/0020216 A1 Feb. 21, 2002

Related U.S. Application Data

(60) Provisional application No. 60/273,336, filed on Mar. 6, 2001.

(30) Foreign Application Priority Data

Aug. 17, 2000 (DE) .......................................... 100 40 131

(51) Int. Cl.$^7$ ............................................. G01F 23/28
(52) U.S. Cl. ..................... 73/290; 73/290 R; 73/570; 73/614; 73/615; 73/624
(58) Field of Search .................... 73/290 R, 290 V, 73/570, 614, 615, 624; 340/450, 612, 618

(56) References Cited

U.S. PATENT DOCUMENTS 4,661,817 A  *  4/1987 Bekkadal et al. ........... 342/124
4,901,245 A  *  2/1990 Olson et al. ................ 364/509

FOREIGN PATENT DOCUMENTS

DE         195 41 459         5/1997

\* cited by examiner

Primary Examiner—Hezron Williams
Assistant Examiner—Rodney Frank
(74) Attorney, Agent, or Firm—Nath & Associates PLLC; Marvin C. Berkowitz

(57) ABSTRACT

A filling-level measuring device, specifically a filling-level radar system, comprises a transmitter (1), a receiver (2) for an echo of a signal emitted by the transmitter (1), and an evaluation circuit (3) for estimating the filling level. The transmitter (1) and the receiver (2) are suitable for operation with a plurality of frequencies on the part of the emitted signal and the echo.

13 Claims, 2 Drawing Sheets

FILLING-LEVEL MEASURING DEVICE THAT EVALUATES ECHO SIGNALS

Figure 1:
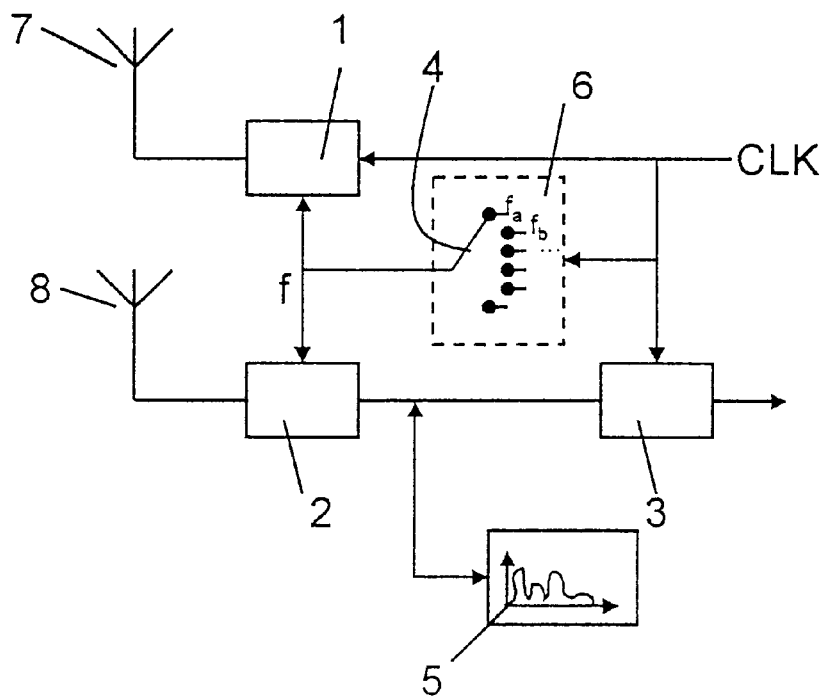

This application is a non-provisional of U.S. provisional application no. 60/273,336 filed Mar. 6, 2000.

A filling-level measuring device that evaluates echo signals

The present invention relates to a filling-level measuring device which emits a signal for the purpose of determining the filling level of a material in a container and which evaluates a received echo of the signal.

So-called filling-level radar systems which operate according the method indicated above are known to the prior art. Current filling-lever radar systems emit a pulsing radio signal with an established center frequency $f_M$ and a bandwidth B. The transmitting and receiving antenna of these filling-level measuring radar systems are adjusted to this frequency range.

These filling-level measuring radar systems are used to monitor the filling level of a number of substances in containers of differing materials. The received echo signal is composed of contributions from the monitored filling level, the walls of the container, and other possible sources of interference; here the ratio of the intensities of the individual echo contributions can vary strongly, depending on the substance being monitored, the material of the container wall, and the working frequency of the radar. Thus the measuring accuracy of this kind of filling-level measuring radar may vary considerably depending on the application environment.

This state of affairs is not desirable, either for the users of these filling-level measuring radar systems, who are interested in reliable measurement, or for the manufacturers of such systems, who receive requests for specifications on the measuring accuracy of the system and who run the risk of being held liable if they give too optimistic an appraisal of the measuring accuracy and of seeing the customer choose a different system if the appraisal is too conservative. Thus there is considerable need for a filling-level measuring device with a transmitter, a receiver for an echo emitted by the transmitter, and an evaluating circuit for estimating the filling level on the basis of the transit times of different contributions of the echo—a device which can deliver measuring results of essentially unchanging accuracy for a number of application environments, more precisely, for a number of combinations of monitored substances, container materials, etc.

The invention solves this problem with a filling-level measuring device of the indicated type in which the transmitter and the receiver are suitable for operation with a plurality of frequencies on the part of the transmitted signal and the echo. When installed, e.g., in the application environment of a testing phase, this kind of filling-level measuring device permits the testing of various available frequencies and—when measurements are performed in long-term operation—allows selection of the frequency that provides the best measuring accuracy, e.g., the best signal-to-interference ratio or the most intensive echo from the surface of the substance being monitored.

This kind of filling-level measuring device may comprise a transmitter and receiver module which can be adjusted to the same frequency, as 'selected from a set of frequencies.

In a preferred embodiment the frequency of the transmitter and receiver module can also be changed during operation of the device. In this way it is possible to receive echoes on all frequencies of the set and, for example, to employ the best echo in estimating the filling level in the evaluation circuit.

It is expedient for the change in frequency to be performed in cyclical fashion by the filling-level measuring device itself.

In a second preferred embodiment the transmitter is suitable for transmitting simultaneously on a number of frequencies and the receiver comprises a number of receiver modules which are suitable for receiving a number of frequencies. With this kind of filling-level measuring device a plurality of echo signals can be obtained at the different frequencies in relation to the same measuring point, and the echo signals are emitted at the same time from the receiver modules, which facilitates processing in the evaluating circuit as compared to a successive generation of the echo signals.

Another improvement in measuring accuracy can be achieved by linking the echo signals obtained at the different frequencies. To filter out the interference contributions it is expedient to assure that the evaluating circuit takes into account only those contributions that occur in at least two echo signals of different frequency, or even more strictly, in all echo signals.

Other features and advantages of the filling-level measuring device according to the invention will emerge in the following exemplary embodiments, which are described with reference to the figures.

Figure 3:
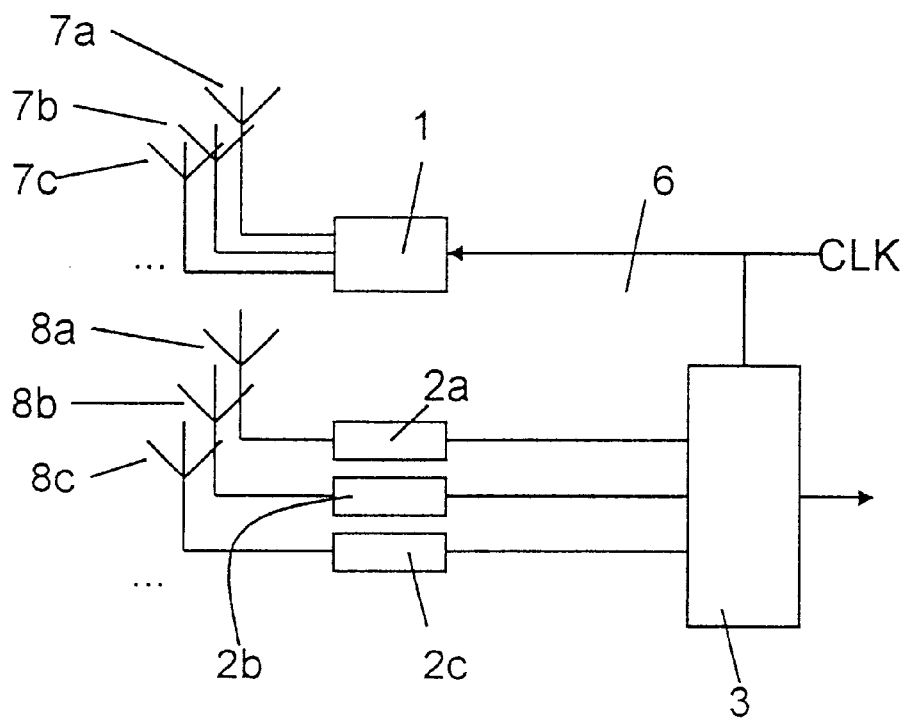
Figure 2A:
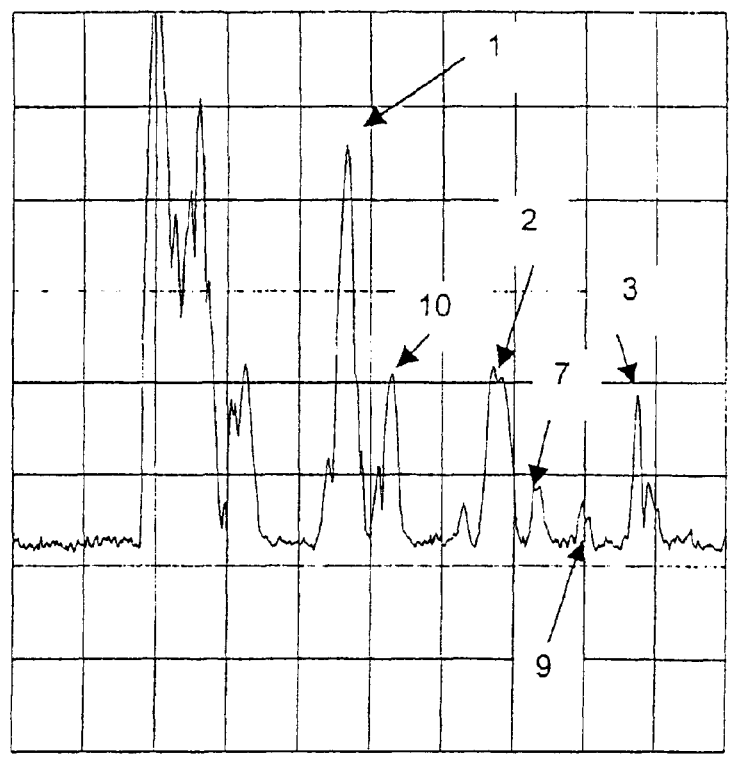
Figure 2B:
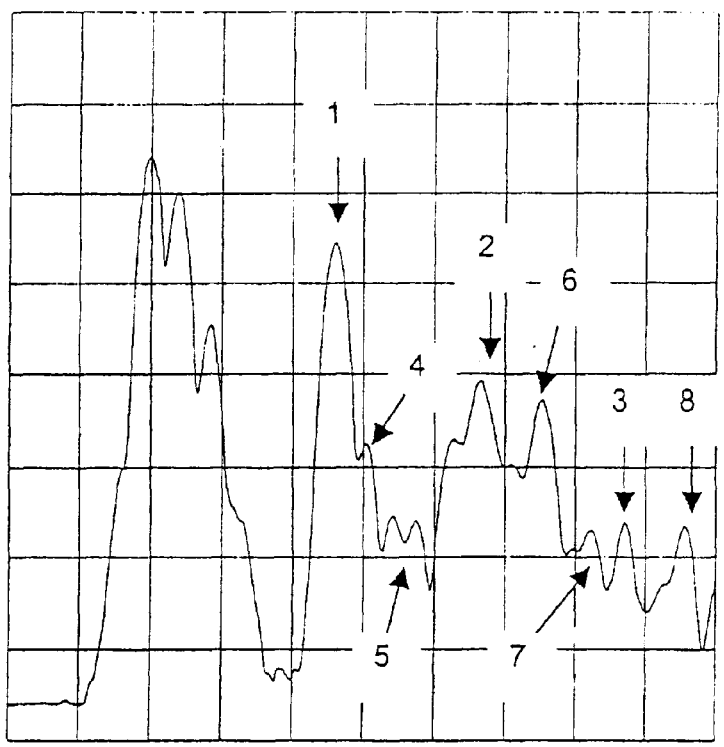

Shown are:

FIG. 1: a block diagram of an initial exemplary embodiment of a filling-level measuring device according to the invention FIGS. 2a and 2b: examples of echoes measured at different frequencies, and FIG. 3 a block diagram of a second embodiment of the filling-level measuring device On the basis of a highly schematized block diagram, FIG. 1 shows an initial embodiment of a filling-level measuring radar system that exemplifies a filling-level measuring device according to the invention. The filling-level measuring device comprises a high-frequency transmitter 1, which emits high frequency pulses of a selectable frequency, as controlled by a CLK timing signal. The frequency of the emitted pulses is given by a signal f adjacent to the frequency control input of the transmitter 1. The transmitter can be composed of, e.g., a number of already known transmitter modules for a fixed frequency, one of which is activated by the signal f. As an alternative, the signal f can be local oscillator signal, which provides a reference oscillation with the working frequency of the transmitter.

As a complement thereto, a receiver 2 is present which receives echoes of the high frequency signal emitted by the transmitter 1 returning from the spatial volume being monitored and which can be set by the identical frequency control signal f to a number of reception frequencies, in each case according to the transmitting frequencies used by the transmitter. The receiver 2 may also consist of a number of receiver modules, each for a fixed frequency. A shared transmitting and receiving antenna 7 or 8 can be assigned to the transmitting and receiving modules, which is particularly useful when the individual frequencies are close together or in a harmonic relation to each other; thus an antenna of fixed dimensions is suitable for receiving a number of frequencies. Individual antennas can also be assigned to the modules, however. Since the reception of the echo signals is staggered in time relative to the pulsed signals emitted by the transmitter, an antenna for one or several frequencies can simultaneously serve as a transmitting and receiving antenna.

An electrical signal representing the time curve of the echo intensity is delivered by the receiver 2 to an evaluating circuit 3; from the different contributions of the echo, i.e., the various maxima of the echo intensity for different signal transit times, the evaluating circuit 3 identifies the contribution of the monitored level of the material in the container to which the measuring device is attached. The evaluating circuit 3 calculates the filling level on the basis of this contribution and feeds it out. Any desirable process known to the prior art can be used to operate the evaluating circuit 3, but the process is not a component of the present invention and consequently is not described in detail.

In an initial, simple embodiment of the filling-level measuring device a selector switch 4 for actuation-by the operating personnel is provided; by means of this selector switch 4 the operator is in a position to set the signal f and thus to select the transmitting and receiving frequency of the device from a number of predetermined frequencies $f_a$, $f_b$ . . . . This selector switch 4 will be expediently installed by a service technician when the filling-level measuring device is installed in a given application environment, in order to produce test echo signals from the monitored container and the material within it at the different frequencies $f_a$, $f_b$ . . . which the transmitter 1 is able to provide, and in order to judge the quality of the echo signals in comparative fashion. This can be done, e.g., with an oscilloscope 5 attached temporarily to the outlet of the receiver 2.

FIGS. 2a and 2b show two examples of this kind of configuration for echo signals obtained at different frequencies. In these figures the ordinate is a time axis and the abscissa represents the intensity of the received echo signal. A comparison of FIG. 2a and 2b shows that the frequency in FIG. 2a clearly provides sharper echo signals than frequency in FIG. 2b. For example, in FIG. 2a a peak designated 10 is clearly distinguishable from a sharp peak designated 1, whereas it melts into the adjacent peak for the frequency in FIG. 2b and cannot be clearly distinguished. Thus the frequency in FIG. 2a promises to be better suited for monitoring the filling level.

When the service technician has performed the echo evaluation for the different frequencies and has chosen the best-suited frequency, he fixes it in place on the selector switch 4, for further use by the measuring device; subsequent modification by the user is not provided for. The selector switch 4 can therefore be positioned inside of a housing, so as to be inaccessible from the outside when the housing is closed; it can also be operated by a fixed wiring attached by the service technician or by a jumper.

In a further elaboration of the filling-level measuring device the selector switch 4 is replaced by a selector circuit 6 depicted in outline by the broken line in FIG. 1; controlled by the CLK timing signal, the selector circuit 6 varies the signal f and thus sets the transmitter 1 and the receiver 2 to changing frequencies $f_a$, $f_b$ . . . in cyclical fashion. In this way the evaluation circuit 3 periodically receives echo signals of all working frequencies $f_a$, $f_b$ . . . used by the transmitter and receiver, in order to calculate the filling level from them. It is useful if the measured value for the filling level as provided by the evaluating circuit is an average value of the measured values obtained for the various frequencies. The average value can be formed in weighted fashion by taking into consideration the reliability of the measuring values obtained for the various frequencies.

FIG. 3 shows a second embodiment of the filling-level measuring device, in which the transmitter 1 simultaneously emits high frequency pulses with a number of different frequencies $f_a$, $f_b$ . . . , as indicated in the figure by several transmitting antenna 7a, 7b, 7c. The receiver 2 comprises a plurality of receiver modules 2a, 2b, 2c . . . , each set to one of the frequencies emitted by the transmitter 1 and each depicted here with its own receiving antenna 8a, 8b, 8c. As with the embodiment shown in FIG. 1, several transmitter or receiver modules can employ the same transmitting or receiving antennas if this is permitted by the frequencies of these transmitter/receiver modules. A transmitter and a receiver module with the same frequency can also use of common antenna for transmitting and receiving. The receiver modules 2a, 2b . . . synchronously deliver the echo signals of the different frequencies to the evaluation circuit 3. By comparing the different echo signals the evaluation circuit 2 is able to improve the measuring result as compared to the isolated evaluation of a single echo signal. More precisely, the evaluation circuit yields a product in the form of $I(t) = I_a(t) \times I_b(t)$, where $I_a(t)$, $I_b(t)$ . . . designate the intensities of the echo signals received by the receiver modules 2a, 2b . . . as a function of time (t). The examination of FIGS. 2a, 2b quickly reveals that for transit times t this product will exhibit large values, for which certain contributions are exhibited by all echo signals, while contributions that are present in only individual echo signals and are with great likelihood to be attributed to interference are lost in the product. Thus, e.g., in a product of the echo signals shown in FIGS. 2a and 2b, the peaks 1, 2, 3, and 7 are easily identified, but peaks 4, 5, 6, 8, 9, and 10 are not. In this way, the number of echoes to be evaluated can be reduced from 10 to 4 in the example shown by FIGS. 2a, 2b. The product thus obtained can be evaluated in a known manner, just like an output signal from the receiver 2 in FIG. 1.

In many applications the strongest echo does not come from the surface of the material being monitored but rather from a fixed surface in the vicinity of the measuring device. To prevent the mathematical product that corresponds to the surface of the measured material from becoming insignificantly small as compared to the product that corresponds to the fixed surface, it is useful to restrict the number of frequencies under simultaneous consideration to not more than, e.g., four.

Another possibility for performing a comparative evaluation of the echo signals is to determine the position of the peaks in the individual echo signals and to map onto each other the peaks of different echo signals whose transit time difference does not exceed a predetermined threshold, and again to evaluate those peaks that occur in all echo signals, or at least in large portion them.

This kind of evaluation is also possible for the second embodiment of the filling-level measuring device described with reference to FIG. 1 when the evaluation circuit 3 is additionally equipped with buffer storage units for the intermediate storage of echo signals received at different frequencies $f_a$, $f_b$, or at least the position of the peaks of these echo signals.

The invention described above on the basis of a filling-level measuring radar system can be directly transferred to measuring devices that emit other types of signals, such as optical or acoustic signals, and that evaluate their echoes.

What is claimed is:

1. A filling-level measuring device with:
   a transmitter adapted to periodically emit signals at one of a plurality of frequencies ($f_a f_b$ . . . ),
   a receiver adapted to receive corresponding echos of the signals periodically emitted by the transmitter at the one of the plurality of frequencies ($f_a f_b$ . . . ),
   an evaluation circuit for measuring a filling level on the basis of transit times of different portions of the echos, and
   selector means for cyclically setting the transmitting and receiving frequency to another one of the plurality of frequencies, and wherein the evaluation circuit periodically receives echos corresponding to all frequencies ($f_a, f_b \ldots$) emitted by the transmitter to calculate the filling level therefrom.

2. A filling-level measuring device according to claim 1, wherein the transmitter and the receiver each comprise a transmitter or receiver module that can be set to a same frequency chosen from the plurality of frequencies ($f_a, f_b \ldots$).

3. A filling-level measuring device according to claim 2, wherein the frequency of the transmitter and the receiver module can be changed during operation of the device.

4. A filling-level measuring device according to claim 3, wherein the frequency is changed cyclically by the device.

5. A filling-level measuring device according to claim 1, wherein the transmitter is suitable for simultaneous transmission on the plurality of frequencies ($f_a, f_b \ldots$) and the receiver exhibits a plurality of receiver modules, each suitable for the reception of one of the plurality of frequencies.

6. A filling-level measuring device according to claim 1, wherein the evaluation circuit, in estimating the filling level, takes into account those portions of the echos that occur for at least two frequencies.

7. A filling-level measuring device according to claim 6, wherein the evaluation circuit in estimating the filling level, takes into account those portions of the echos that arise for all received frequencies.

8. A filling-level measuring device according to claim 1, wherein the signal is a high frequency radio signal.

9. A filling-level measuring device according to claim 1, wherein said selector means is a selector switch.

10. A filling-level measuring device according to claim 1, wherein said selector means is a selector circuit.

11. A filling-level measuring device according to claim 6 wherein said evaluation circuit measures the filling level as an average value of measured values obtained for the at least two frequencies.

12. A filling-level measuring device according to claim 11 wherein the average value is formed as a weighted average of the measured values.

13. A filling-level measuring device with:
- a transmitter adapted to emit signals having a plurality of frequencies ($f_a, f_b \ldots$);
- a receiver adapted to receive echos corresponding to each of the plurality of emitted signal frequencies ($f_a, f_b \ldots$) emitted by the transmitter; an evaluation circuit for measuring a filling level on the basis of transit times of different portions of the echos,
- wherein the evaluation circuit, in estimating a filling level, takes into account those portions of the echos that occur for at least two frequencies.

* * * * *

UNITED STATES PATENT AND TRADEMARK OFFICE
CERTIFICATE OF CORRECTION

PATENT NO.     : 6,684,696 B2
DATED          : February 3, 2004
INVENTOR(S)    : Schultheiss It is certified that error appears in the above-identified patent and that said Letters Patent is hereby corrected as shown below:

Column 5,
Line 1, after "wherein" insert -- during each measurement cycle --.

Signed and Sealed this

Thirteenth Day of July, 2004

JON W. DUDAS
*Acting Director of the United States Patent and Trademark Office*